United States Patent [19]
Van Lerberghe

[11] Patent Number: 5,942,351
[45] Date of Patent: Aug. 24, 1999

[54] MOISTURE-PROOF HOUSING FOR CONTAINING AN ELECTRIC ACCUMULATOR

[75] Inventor: Steven Van Lerberghe, Le Mans, France

[73] Assignee: U.S. Philips Corporation, New York, N.Y.

[21] Appl. No.: 08/950,563

[22] Filed: Oct. 15, 1997

[30] Foreign Application Priority Data

Oct. 22, 1996 [FR] France .................................. 96 12807

[51] Int. Cl.$^6$ .................................................. H01M 2/12
[52] U.S. Cl. ............................ 429/55; 429/89; 429/162; 429/185
[58] Field of Search ............................ 429/53–56, 127, 429/162, 163, 82, 89, 185

[56] References Cited

U.S. PATENT DOCUMENTS

| | | | |
|---|---|---|---|
| 4,614,695 | 9/1986 | Ibbott | 429/127 |
| 4,664,994 | 5/1987 | Koike et al. | 429/163 |
| 4,678,725 | 7/1987 | Kikuchi et al. | 429/53 |
| 5,326,652 | 7/1994 | Lake | 429/127 |
| 5,652,043 | 7/1997 | Nitzan | 429/162 X |

FOREIGN PATENT DOCUMENTS 9606356  5/1996  France .

*Primary Examiner*—Stephen Kalafut
*Attorney, Agent, or Firm*—Dicran Halajian

[57] ABSTRACT

A moisture-proof housing is disclosed intended for containing a battery. The housing includes two walls or plates which are kept in place by a sealing band located therebetween which defines interior of the housing. Portions of the walls, namely wall or plate protrusions, extend beyond the sealing band. One of the plates has a hole located exterior to the housing during normal conditions. The sealing band includes a movable part which slides between the two plates. When the interior housing pressure exceed the exterior pressure, the movable part slides outward to include the hole within the housing interior. This provides a safety valve and vents out the excessive interior pressure. A stop device is provided to avoid excessive displacement of the movable band, such as displacement beyond the plate protrusions.

8 Claims, 3 Drawing Sheets

5,942,351

MOISTURE-PROOF HOUSING FOR CONTAINING AN ELECTRIC ACCUMULATOR

FIELD OF THE INVENTION

The invention relates to a moisture-proof housing for withstanding a certain pressure and intended for notably containing at least one electric accumulator or battery element, the housing being formed by at least one wall on which there is at least one closing area formed by a plastic band which has a part that can be shifted.

The invention also relates to a flat accumulator in the form of such a housing.

The invention finds highly significant applications, for example, for containing an accumulator of the lead acid type.

BACKGROUND OF THE INVENTION

U.S. Pat. No. 5,326,652 describes such an accumulator and its housing. However, in that document, the problem of the internal pressure of the accumulator is not mentioned. In fact, accumulators create pressures inside enclosures formed by housings containing them. This pressure may sometimes be so large that the enclosure explodes, especially if the accumulator is of the type containing lithium. Valves may then be provided which open when the pressure exceeds a certain value that is incompatible with the rigidness of this enclosure. When the enclosure pressure increases, a band at a tightening part of the valve may protrude from the walls of the housing of the container. However, once the internal or container gas pressure returns to its normal value, it is possible that the protruding band does not return to its initial position. Another problem is preventing outside air from entering the housing, thereby contaminating the battery elements, when the internal pressure is less than the external pressure.

SUMMARY OF THE INVENTION

The present invention is a moisture-proof housing comprising an efficient and cost-effective valve which largely solves problems of conventional housings.

The housing comprises a sealing band located between two walls of the housing. The sealing band seals the interior of the housing and has a tightening or distortable part. A stop device is provided for imposing limits to the displacement of said tightening part.

Thus, thanks to the invention, in the case where there is too much interior pressure, the tightening part which is not attached to the edges of the walls, may shift outward to include an opening of one of the walls within the housing interior, so that the gas creating an excessive pressure may escape. The stop device prevent over-displacement of the tightening part either outward or inward. For example, when the interior pressure is larger than the exterior pressure, then the stop device prevents outward over-displacement and allows the tightening part to return to its initial position once the large interior pressure vents out and equalizes with the interior pressure. Alternatively or in addition to, in the under-pressurized case where the interior pressure is smaller than the exterior pressure, the stop device prevents interior over-displacement of the tightening part and over-deformation thereof.

These and other aspects of the invention will be apparent from and elucidated with reference to the embodiments described hereinafter.

DESCRIPTION OF PREFERRED EMBODIMENTS

Figure 1:
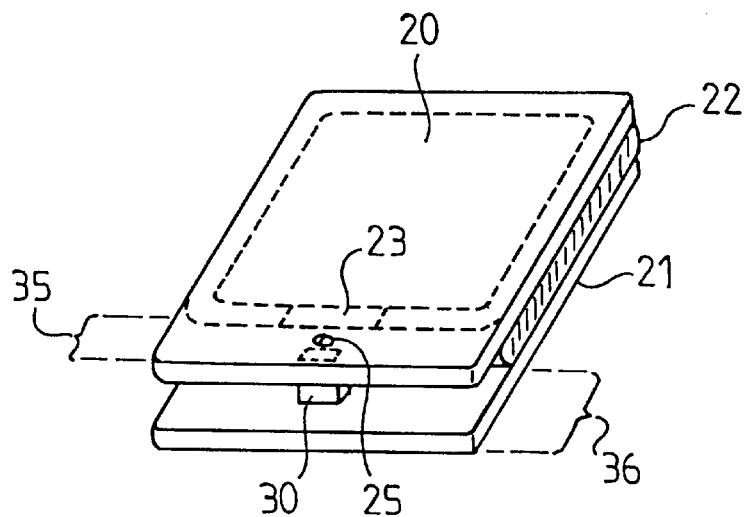
FIG. 1 shows an perspective view of a housing according to the invention.

FIG. 1 shows a housing according to the invention. For other embodiment features, reference may be made to French patent application No. 96 06356, filed May 22, 1996 in the name of the applicants. This housing is formed by two plates 20 and 21 arranged opposite each other and connected by a silicon-based polymer band 22 which is placed around the periphery of these two plates 20 and 21. The band thus forms a closing area. The format of this housing is similar to credit cards used by the public at large. This housing is, more particularly, intended to contain lithium-ion battery elements and/or of a type described in U.S. Pat. No. 5,326,652, that is, having a large-capacitance supply capacitor. In the housing of FIG. 1, the closing band 22 comprises an adhesive part and a tightening part 23. The adhesive part is the part for which the plastic band 22 is stuck to the plates 20 and 21 either by its natural adhesion or by glue or by sealing. The tightening part is not adhered at all to the edges or if so, only slightly adhered. This may be realized by a teflon coating. This tightening or distortable part 23 is thus kept in place in that it is held between the two plates 20 and 21. This tightening or distortable part 23 may also be kept in place by hollow grooves which hold the band 22 adequately in place. This tightening part 23 may be distorted under the effect of pressure and may let the gas escape from the housing interior when excessive over-pressure occurs therein, by letting the excessive internal gas pass through an opening 25. This is better shown in FIG. 2. Under the influence of the inside pressure P, the part called tightening part 23 slides between the two plates 20, 21 to include the hole 25 withing the housing interior.

Figure 2:
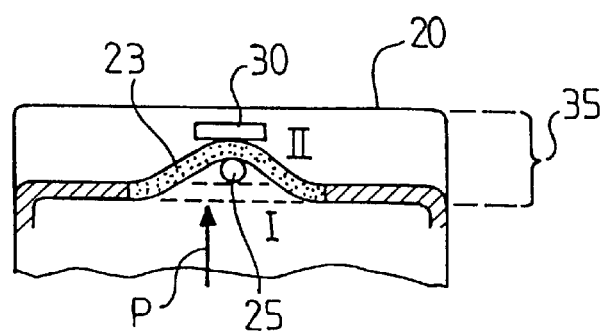
FIG. 2 shows a cross-sectional view of the an opening area according to the invention.

However, one wishes to avoid the tightening part 25 of the band protruding beyond the edges of the two plates 20, 21. Therefore, according to the invention, a stop device 30 is provided which is formed here by a lug provided between the two plates. Each of the plates 20 and 21 has a prominence 35 and 36 respectively, relative to the band 22 where the tightening part 23 is in an initial position I, shown by dashed lines in FIG. 2. FIG. 2 also shows an expanded position II of the tightening part 23 which is stopped by the lug 30.

Thus, by the measures of the invention, after the excessive internal pressure is vented out through the opening 25 while the tightening part 23 is in its expanded position II, then the tightening part 23 returns to its initial position I. The tightening part 23 returns to its initial position I by sliding inward between the prominence or protrusions 35, 36. This arrangement of the stop 30 and the location of the tightening part 23 between the protrusions 35, 36 prevents jamming of the tightening part 23.

Figure 3:
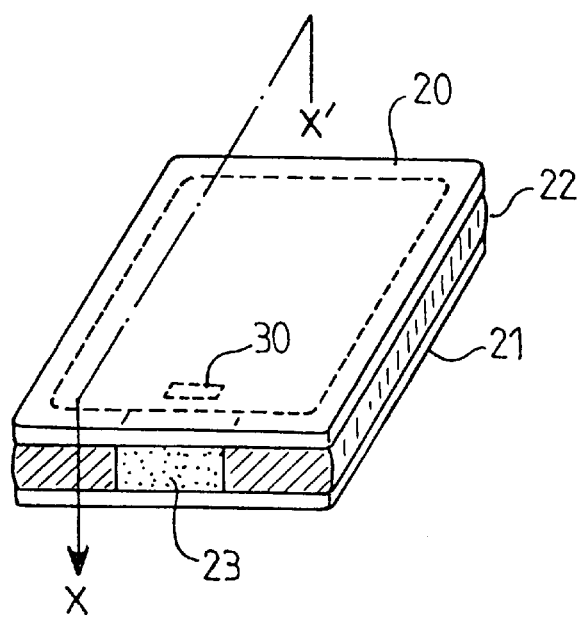
FIG. 3 shows another embodiment of a housing according to the invention.
Figure 4:
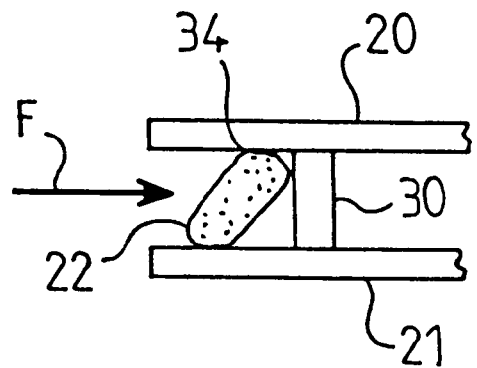
FIG. 4 shows a cross-sectional view of the housing shown in FIG. 3.

As shown in FIG. 3, the stop 30 may be positioned within the housing interior to solve the problem of battery contamination by exterior oxygen. Such a contamination typically occurs when the exterior pressure is larger than the interior pressure. The cross-section along line XX' made at the level of the lug 30 is shown in FIG. 4. In the absence of the stop 30, the exterior pressure F may distort the tightening band 23 such that a leak occurs at a distortion point shown in FIG. 4 as numeral 34. The lug 30 thus prevents this excessive distortion from causing outside air to leak inward.

Figure 5:
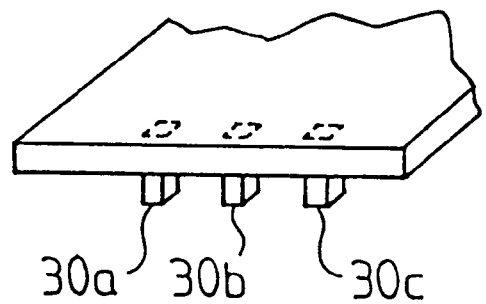
FIG. 5 shows an embodiment of the stop device.

The stop device shown in the preceding figures was formed by a single lug. It may be formed in various manners, for example, by a range of such lugs 30a, 30b and 30c, as is shown in FIG. 5.

Figure 6:
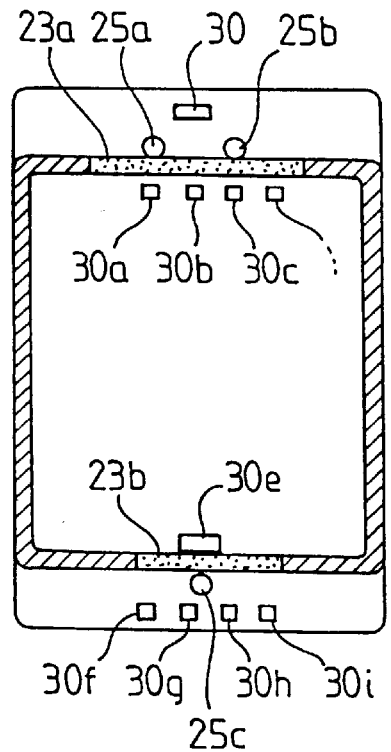
FIG. 6 shows a plan view of a variant of the embodiment shown in FIG. 3.

FIG. 6 shows a manner which combines the various ways of realizing said housing.

As shown in FIG. 6, the housing may comprise a plurality of tightening zones 23a and 23b. Also a plurality of holes 25a and 25b may be provided. Inner lugs 30a, 30b and 30c prevent the tightening band 23a from excessively deforming and moving toward the inside of the housing. This avoids the outer oxygen from contaminating the housing interior. An outer lug 30 prevents the tightening band 23a from protruding to the exterior of the housing. At a second tightening band 23b located on opposite side of the first tightening band 23a, a single lug 30e is provided for stopping excessive movement of the second tightening band 23b toward the inside of the housing, whereas a range of lugs 30f, 30g, 30h, 30i is provided for preventing excessive movement toward the housing exterior. Thus, the displacement of the tightening part 23 is guided and stopped by the stop device.

Figure 7:
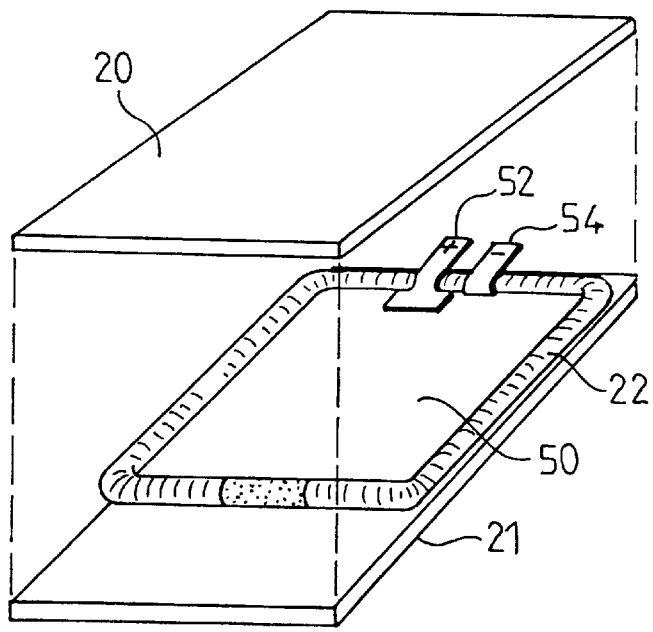
FIG. 7 shows a flat battery formed using the housing according to the invention.

FIG. 7 shows in an exploded view an accumulator according to the invention. It is formed by a flat housing of the type shown in the preceding figures and by an accumulator element 50 of a type described in cited patent. The electrodes of this element 50 are accessible by plates 52 and 54 which are coated by a band so as to ensure the moisture tightness.

As a matter of course, the electric accumulator element may be of any other type. Similarly, the tightening band can be placed only along part of the periphery, while the other part may be formed by a rigid, soldered or molded material.

The lug 30 may be formed by a piece of elastic which may be flexible.

I claim:

1. A housing comprising:
   a sealing band located between walls of the housing; said sealing band sealing an interior of the housing and having a shiftable part; and
   a stop device which limits displacement of said shiftable part.

2. The housing of claim 1, wherein said stop device includes a lug.

3. The housing of claim 1, wherein said stop device includes a plurality of lugs.

4. The housing of claim 1, wherein one of said walls has an opening located on an outer side of said interior when an interior pressure of the interior is substantially equal to an outer pressure of the outer side; and wherein, when said interior pressure is greater than said outer pressure, said shiftable part moves to include said opening in said interior for venting said interior pressure.

5. The housing of claim 1, wherein one of said walls has a protrusion for holding said stop device.

6. An accumulator formed by at least one battery element and a housing as claimed in claim 1.

7. The accumulator of claim 6, wherein said walls are formed by plates so that said accumulator is in a flat form.

8. The accumulator of claim 6, wherein said walls are flat plates.

* * * * *